US005765950A

United States Patent [19]

Eno et al.

[11] Patent Number: 5,765,950

[45] Date of Patent: Jun. 16, 1998

[54] THRUST BEARING ASSEMBLY

[75] Inventors: James Joseph Eno; Antonio Tinio Ganzon, both of Romulus, N.Y.

[73] Assignee: Goulds Pumps, Incorporated, Midland Park, N.J.

[21] Appl. No.: 753,769

[22] Filed: Nov. 29, 1996

[51] Int. Cl.$^6$ .............................. F16C 3/00; F16C 33/10; F16C 17/04

[52] U.S. Cl. .............................. 384/97; 384/368; 384/425

[58] Field of Search .............................. 384/97, 193, 194, 384/243, 368, 371, 420, 425

[56] References Cited

U.S. PATENT DOCUMENTS

| | | | |
|---|---|---|---|
| 1,700,856 | 2/1929 | Schien | 384/368 |
| 1,845,789 | 2/1932 | Gilson | 384/368 |
| 2,942,555 | 6/1960 | Pezzillo . | |
| 2,991,837 | 7/1961 | Postlewaite . | |
| 3,294,456 | 12/1966 | Williams et al. . | |
| 3,742,595 | 7/1973 | Lykes | 29/596 |
| 3,842,298 | 10/1974 | Schaefer | 310/87 |
| 3,947,153 | 3/1976 | Matthias et al. | 417/365 |
| 4,329,122 | 5/1982 | Owada et al. | 417/365 |
| 4,332,524 | 6/1982 | Smith | 415/176 |
| 4,350,911 | 9/1982 | Wilson et al. | 310/87 |
| 4,477,235 | 10/1984 | Gilmer et al. | 417/414 |
| 4,575,264 | 3/1986 | Mizobuchi et al. | 384/369 |
| 4,575,315 | 3/1986 | Galais et al. | 417/365 |
| 4,768,888 | 9/1988 | McNaull | 384/129 |
| 5,033,937 | 7/1991 | Wilson | 415/170.1 |
| 5,035,519 | 7/1991 | Aizawa et al. | 384/368 X |
| 5,076,716 | 12/1991 | Mizobuchi et al. | 384/369 |
| 5,466,071 | 11/1995 | Slocum | 384/118 |

*Primary Examiner*—Thomas R. Hannon
*Attorney, Agent, or Firm*—Brezina & Ehrlich

[57] ABSTRACT

A thrust bearing assembly for a submersible motor assembly of a submersible pump assembly comprising first and second bearing members or plates and first and second bearing holders contained within a housing. Each bearing plate is in the form of a disk having a bearing surface, and the first and second bearing plates are disposed between the first and second bearing holders with the bearing surfaces in face-to-face contact. The first bearing holder is in the form of a thrust bearing holder, and the second bearing holder is in the form of a gimbal plate. The first bearing plate is adapted to rotate with a rotor shaft of the submersible pump assembly and to impose a thrust load on the second plate, and the second bearing plate is adapted to remain stationary relative to the rotating first bearing plate. Grooves are defined by one or both of the bearing surfaces to allow fluid from a fluid supply to enter between the bearing surfaces to create a fluid film to lubricate and cool the bearing surfaces.

4 Claims, 6 Drawing Sheets

THRUST BEARING ASSEMBLY

The present invention relates generally to a thrust bearing assembly for a submersible pump assembly.

BACKGROUND

Submersible pump assemblies are widely used in connection with wells for use in irrigation or residential systems or other well applications. Generally, submersible pump assemblies include an axial discharge pump which is connected to a discharge pipe and to a submersible motor assembly. The motor assembly is carried coaxially below the pump with a rotor shaft being coupled to a pump impeller shaft. In such arrangement, the rotor shaft carries a substantial axial load due to the weight of the rotor as well as hydraulic loading from the internal components of the pump. In addition, substantial radial loading is often experienced by the motor assembly as a result of the torque required to pump the column of water through the discharge pipe.

The environment in which submersible pump assemblies operate is often quite harsh. The pump and motor assembly are submerged in the well fluid, and the motor assembly should be fluid-tight to prevent the well fluid from leaking into the motor housing and causing damage. Further, the well casing limits the size of the diameter of the motor.

A problem commonly associated with submersible pump assemblies is the bearings supporting the rotor shaft. The bearings must be capable of withstanding substantial axial loads, as well as maintaining proper alignment of the components. It is also important that the bearings be of relatively low friction to avoid losses in the output power of the motor. In addition, the bearings need to be kept cool so as not to fail prematurely due to the heat generated when the motor is running.

Accordingly, it is an object of the present invention to provide a bearing assembly or system for a submersible motor assembly of a submersible pump assembly that can suitably withstand the axial loadings imposed by the rotor shaft of the submersible pump assembly.

It is a further object of the present invention to provide such a bearing assembly having a stationary bearing member adapted to absorb the thrust load imposed on it by a rotating bearing member driven by the rotor shaft of the submersible pump assembly.

It is a further object of the present invention to provide such a bearing assembly wherein the stationary bearing member is secured to a self-aligning pad to maintain contact of the bearing surfaces during operation of the pump assembly.

It is a further object of the present invention to provide such a bearing assembly wherein grooves are defined by at least one of the bearing surfaces to provide fluid for lubricating and cooling the bearing surfaces.

It is a still further object of the present invention to provide such a bearing assembly that is relatively compact and can be manufactured at a relatively low cost.

SUMMARY

In accordance with these and other objects, the present invention provides a thrust bearing assembly or system for a submersible motor assembly of a submersible pump assembly. In accordance with a preferred embodiment, the thrust bearing assembly comprises first and second bearing members or plates and first and second bearing holders contained within a housing. Each bearing plate preferably is in the form of a disk having a bearing surface, and the first and second bearing plates are disposed between the first and second bearing holders with the bearing surfaces in face-to-face contact. Desirably, the first bearing holder is in the form of a thrust bearing holder, and the second bearing holder includes a self-aligning pad or the like in the form of a gimbal plate.

The first bearing plate is adapted to rotate with a rotor shaft driven by the submersible motor assembly and to impose a thrust load on the second plate, and the second bearing plate is adapted to remain stationary relative to the rotating first bearing plate. Accordingly, in the preferred embodiment, the first bearing plate is rigidly secured to the first bearing holder, which is rigidly engaged with one end of the rotor shaft. In a preferred embodiment, the second plate is rigidly secured to the gimbal plate which, in turn, nests within a bore defined by the housing. The first bearing plate preferably is a thrust bearing constructed of a hard material, and the second bearing plate may be constructed of a relatively hard or soft material suitable to facilitate absorption of the thrust load.

In a preferred embodiment of the invention, grooves are defined by one or both of the bearing surfaces to allow fluid to enter between the bearing surfaces to create a fluid film to lubricate and cool the bearing surfaces. Desirably, the grooves are defined by the bearing surface of the second plate to minimize any disturbance by the rotation of the first bearing plate.

The first and second bearing plates and the gimbal plate each define a central hole, and the central holes together define a fluid passageway that is in fluid communication with a fluid reservoir defined by a diaphragm assembly secured to the bottom of the housing. As a result, fluid is supplied to the grooves of the bearing surface from the fluid reservoir through the fluid passageway. Accordingly, the grooves and fluid passageway facilitate lubrication and cooling of the bearing surfaces.

The thrust bearing assembly in accordance with a preferred embodiment of the invention is adapted to absorb axial thrust from the rotor shaft of the submersible pump assembly, and can be used with pump assemblies capable of high rotational speeds. The thrust bearing assembly is also adapted to maintain alignment of the bearing surfaces. The thrust bearing assembly preferably is relatively compact and can be manufactured at relatively low costs.

The thrust bearing assembly provides for distribution of lubricating and cooling fluid between the surfaces of the bearing surfaces of the first and second bearing plates, and also provides sufficient volume of the fluid. The thrust bearing assembly also is well sealed and is adapted to compensate for changes in fluid volume due to pressure and temperature changes.

BRIEF DESCRIPTION OF DRAWINGS

The present invention and the advantages thereof will become more apparent upon consideration of the following detailed description when taken in conjunction with the accompanying drawings:

FIG. 1(*b*) is an enlarged view of one end of the submersible pump assembly of FIG. 1(*a*);

FIG. 2(*b*) is a plan view of a bottom surface of the first bearing plate of the thrust bearing assembly of FIGS. 1(*a*) and 1(*b*);

FIG. 3(*b*) is a plan view of a bottom surface of the second bearing plate of the thrust bearing assembly of FIGS. 1(*a*) and 1(*b*), which is adapted to engage the gimbal plate;

FIG. 4(*b*) is a cross-sectional view taken along the lines b—b of FIG. 4(*a*);

FIG. 4(*c*) is a plan view of a bottom surface of the thrust bearing holder of FIG. 4 (*a*), which is adapted to be secured to a top side of the first bearing plate;

FIG. 4(*d*) is a cross-sectional view taken along the lines d—d of FIG. 4(*c*);

FIG. 5(*b*) is a cross-sectional view taken along the lines b—b of FIG. 5(*a*) and also includes an enlarged window view of a slot defined in the housing for receiving a sealing ring;

FIG. 6(*b*) is a cross-sectional view taken along the lines b—b of FIG. 6(*a*);

FIG. 6(*c*) is a plan view of a bottom surface of the gimbal plate of FIGS. 6(*a*) and 6(*b*);

FIG. 7(*b*) is a cross-sectional view taken along the lines b—b of FIG. 7(*a*);

FIG. 8(*b*) is a cross-sectional view taken along the lines b—b of FIG. 8(*a*)

DETAILED DESCRIPTION OF THE PREFERRED EMBODIMENTS OF THE INVENTION

Figure 1A:
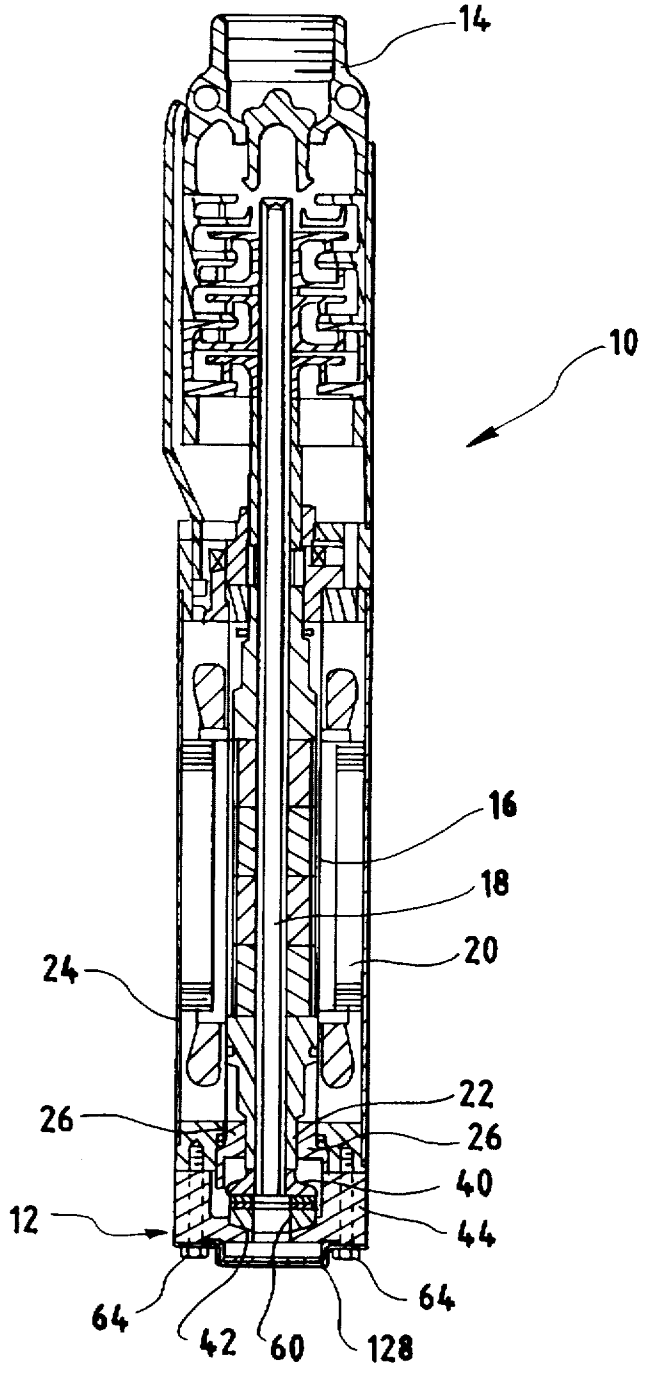
FIG. 1(*a*) is a partial cross-sectional view of a submersible pump assembly taken along its longitudinal axis having a thrust bearing assembly in accordance with a preferred embodiment of the invention.
Figure 1B:
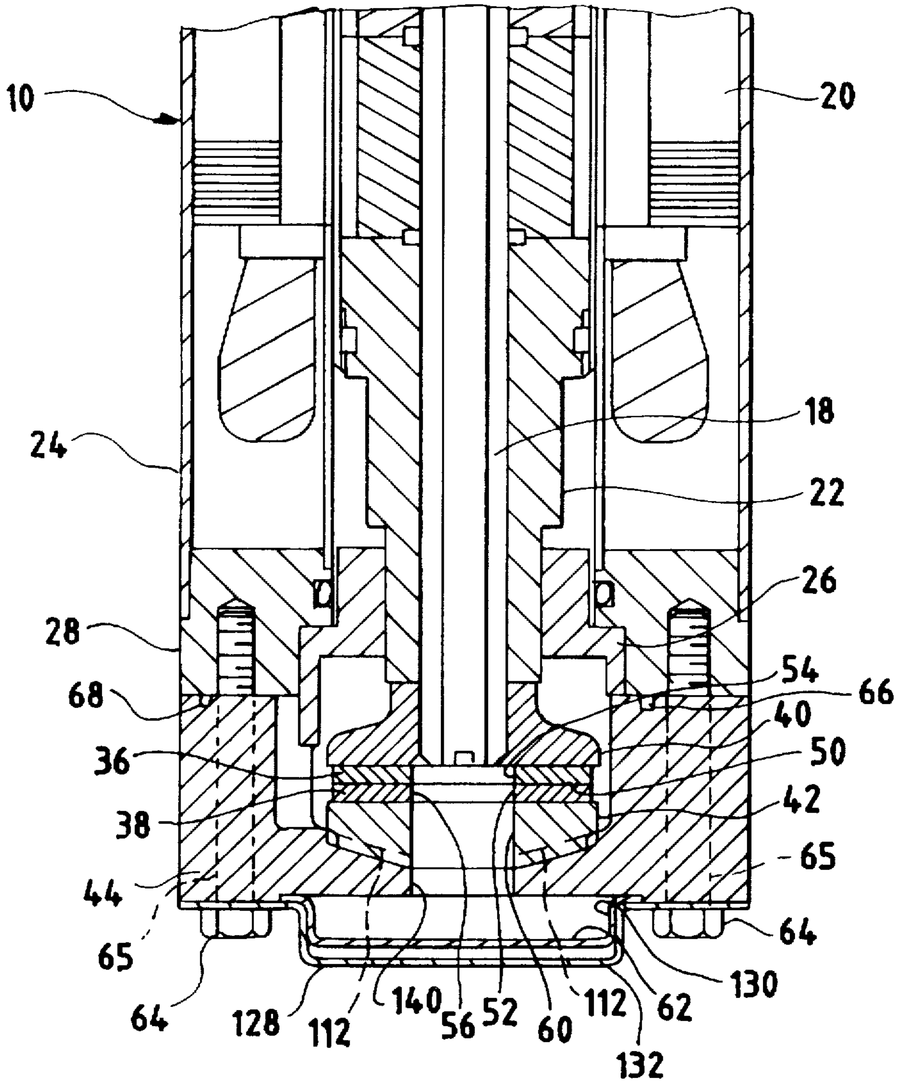
Figure 2A:
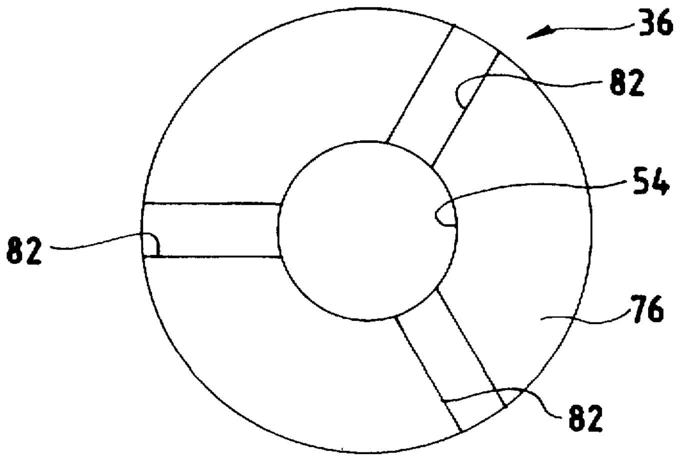
FIG. 2(*a*) is a plan view of a top surface of the first bearing plate of the thrust bearing assembly of FIGS. 1(*a*) and 1(*b*)
Figure 2B:
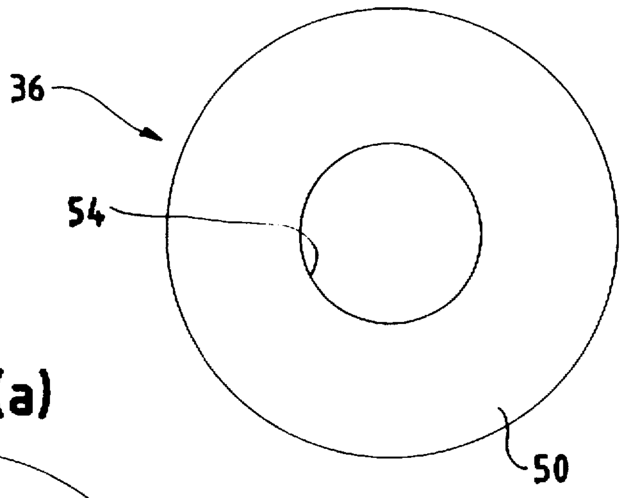

A submersible pump assembly 10 having a thrust bearing assembly 12 in accordance with a preferred embodiment of the invention is illustrated in FIGS. 1(*a*) and 1(*b*). The thrust bearing assembly 12 is included at one end of the submersible pump assembly 10 and a discharge head 14 is included at the other end. The submersible pump assembly 10 may include other components such as, for example, a rotor assembly 16, a rotor shaft 18, a submersible motor assembly 20, a bearing carrier 22, a pump assembly housing 24, a lower radial bearing 26, and an end bell 28.

The thrust bearing assembly 12 in accordance with a preferred embodiment of the invention is illustrated in FIGS. 1–9 as comprising first and second bearing members or plates 36, 38, a first bearing holder desirably in the form of a thrust bearing holder 40, a second bearing holder desirably in the form of a gimbal plate 42, and a housing 44. The first and second bearing plates 36, 38 may be in the form of disks, and have respective bearing surfaces 50, 52 and define respective central holes 54, 56. The first and second bearing plates 36, 38 are disposed between the first and second bearing holders 40, 42, with the bearing surfaces 50, 52 in face-to-face contact. The gimbal plate 42 defines a central hole 58, and the central holes 54, 56, 58 together define a fluid passageway 60 that is in fluid communication with a fluid reservoir 62 described below.

In the illustrated embodiment, the thrust bearing assembly 12 is secured to the end bell 28 by three fasteners 64 which are received within apertures 65 defined by the housing. A sealing ring or O-ring 66 may be included to seal the thrust bearing assembly 12. In the illustrated embodiment, the sealing ring 66 is received within a slot 68 defined in the housing 44 (see, e.g., FIGS. 5(*a*) and 5(*b*)).

During operation of the submersible pump assembly 10, the rotor shaft 18 is driven by the submersible motor assembly 20, and the first bearing plate 36 is adapted to rotate with the rotor shaft 18 and to impose a thrust load on the second bearing plate 38. The second bearing plate 38 is adapted to remain stationary relative to the rotating first bearing plate 36. Accordingly, the first bearing plate 36 is rigidly secured to the thrust bearing holder 40 in any manner, and the thrust bearing holder 40 is engaged with the rotor shaft 18 in any suitable manner. The second bearing plate 38 is held stationary relative to the rotating first bearing plate 36.

In the illustrated embodiment, the rotor shaft 18 has a hexagonal cross section substantially along its length, and the thrust bearing holder 40 defines a channel 70 having a hexagonal cross section for receiving and engaging the rotor shaft 18. Preferably, a top surface 72 of the thrust bearing holder 40 abuts the bearing carrier 22.

A bottom surface 74 of the thrust bearing holder 40 is rigidly secured to a top surface 76 of the first bearing plate 36 in any suitable manner, such as, for example, by an epoxy such as ARALDITE 2015 brand or any other suitable adhesive. Additionally, if desired, the bottom surface 74 of the thrust bearing holder 40 may include radially-extending ribs 80 that are received within radially-extending recesses 82 defined in the top surface 76 of the first bearing plate 36. Preferably, the ribs 80 and the recesses 82 have square or rectangular cross sections (see, e.g., FIGS. 2(*a*) and 4(*b*)–4(*d*)).

A bottom surface 88 of the second bearing plate 38 may be secured to a top surface 90 of the gimbal plate 42 in any suitable manner, such as, for example, by an epoxy such as ARALDITE 2015 or by any other suitable adhesive. Additionally, if desired, the top surface 90 of the gimbal plate 42 may include radially-extending ribs 94 that are received within radially-extending recesses 96 defined in the bottom surface 88 of the second bearing plate 38. Preferably, the ribs 94 and the recesses 96 have square or rectangular cross sections (see, e.g., FIGS. 3(*b*) and 6(*a*)–6(*b*)).

The first bearing plate 36 preferably is a thrust bearing constructed of a hard material, and the second bearing plate 38 may be constructed of the same hard material or, if desired, a relatively soft material suitable to facilitate absorption of the thrust load. For example, the first bearing plate 36 may be constructed of silicon carbide or the like, and the second bearing plate 38 may be constructed of silicon carbide or carbon or engineering plastics or the like.

The gimbal plate 42 nests with a bore 100 defined at the base of the housing 44. In the illustrated embodiment, a bottom surface 110 of the gimbal plate 42 is rounded and includes a pair of elongated members 112 separated by the central hole 58 adapted to be received within a pair of rectangular slots 114 defined in the base of the housing 44 (see, e.g., FIGS. 1(*b*), 5(*a*), 5(*b*), 6(*b*) and 6(*c*)). The elongated members 112 and rectangular slots 114 permit slight movement of the gimbal plate 42 and the second bearing plate 38 relative to the housing 44, and, thus, provide a self-aligning feature to maintain the alignment of the first and second bearing surfaces 50, 52.

Figure 3A:
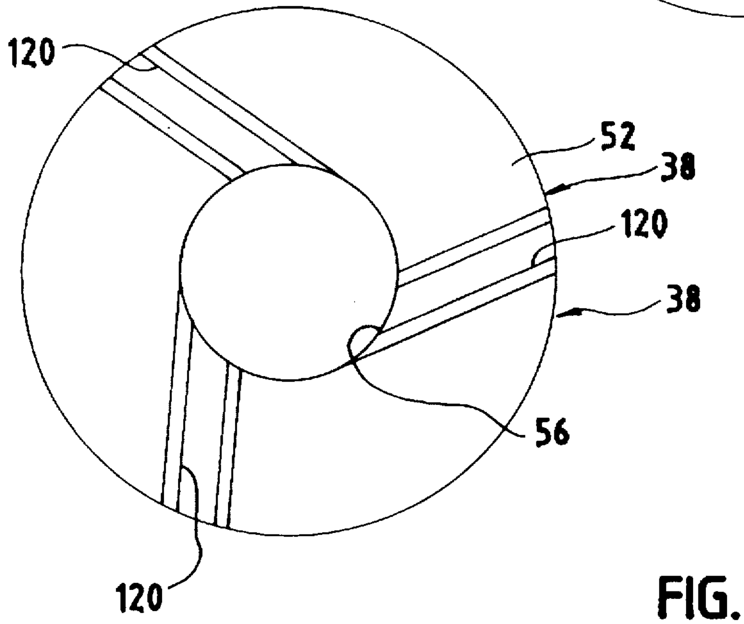
FIG. 3(*a*) is a plan view of a top surface of the second bearing plate of the thrust bearing assembly of FIGS. 1(*a*) and 1(*b*), which is adapted to contact a bottom surface of the first bearing plate.
Figure 3B:
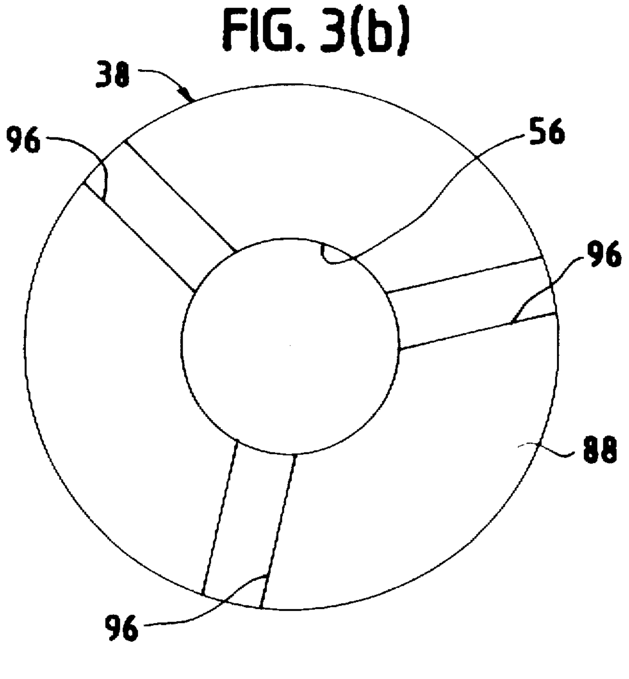
Figure 4A:
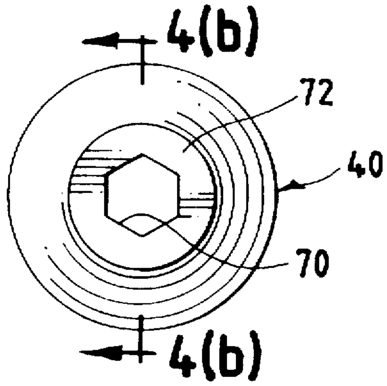
FIG. 4(*a*) is a plan view of a top surface of the thrust bearing holder of the thrust bearing assembly of FIGS. 1(*a*) and 1(*b*)
Figure 4B:
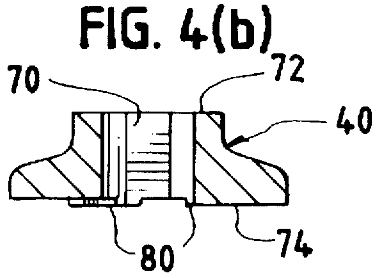
Figure 4C:
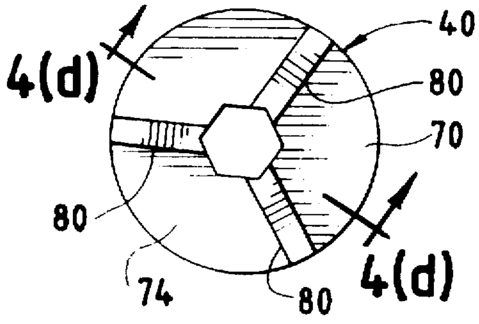
Figure 4D:
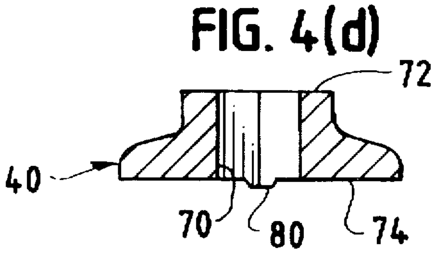
Figure 5A:
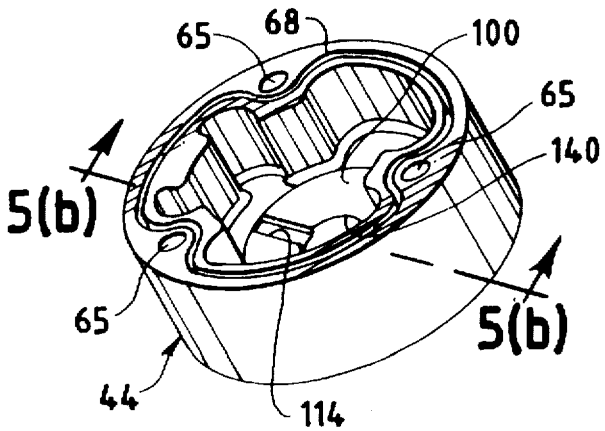
FIG. 5(*a*) is a perspective view of the housing of the thrust bearing assembly of FIG. 1(*a*) and 1(*b*)
Figure 5B:
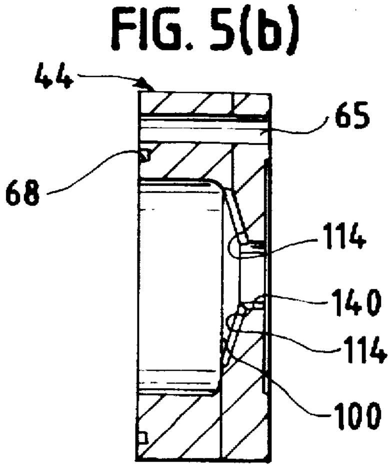
Figure 6A:
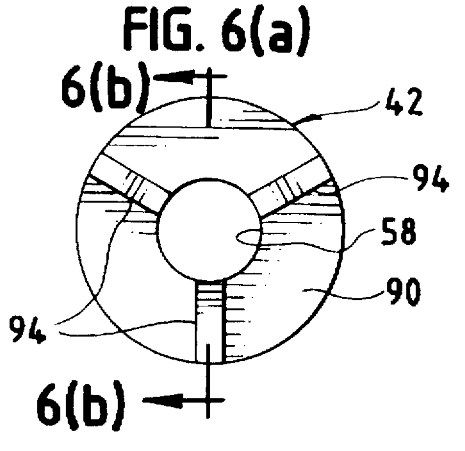
FIG. 6(*a*) is a plan view of a top surface of the gimbal plate of the thrust bearing assembly of FIGS. 1(*a*) and 1(*b*)
Figure 6B:
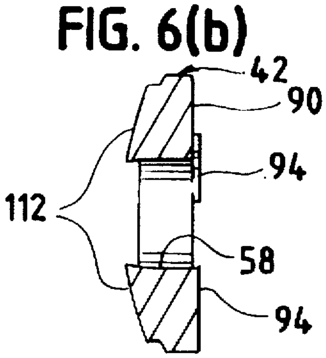
Figure 6C:
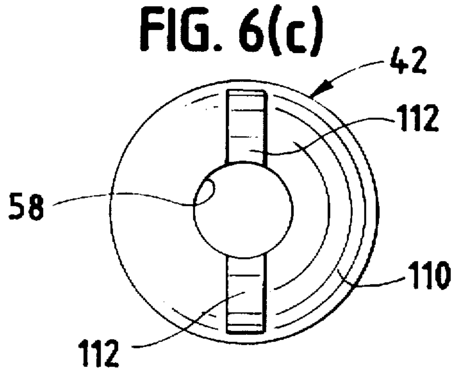
Figure 7A:
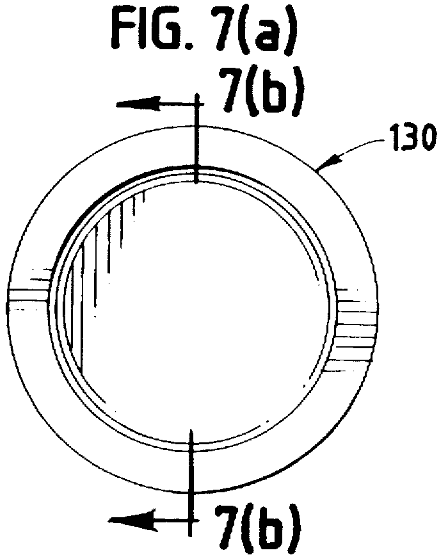
FIG. 7(*a*) is a plan view of the top of the diaphragm of the thrust bearing assembly of FIGS. 1(*a*) and 1(*b*)
Figure 7B:
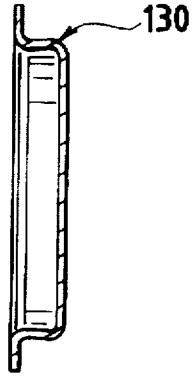
Figure 8A:
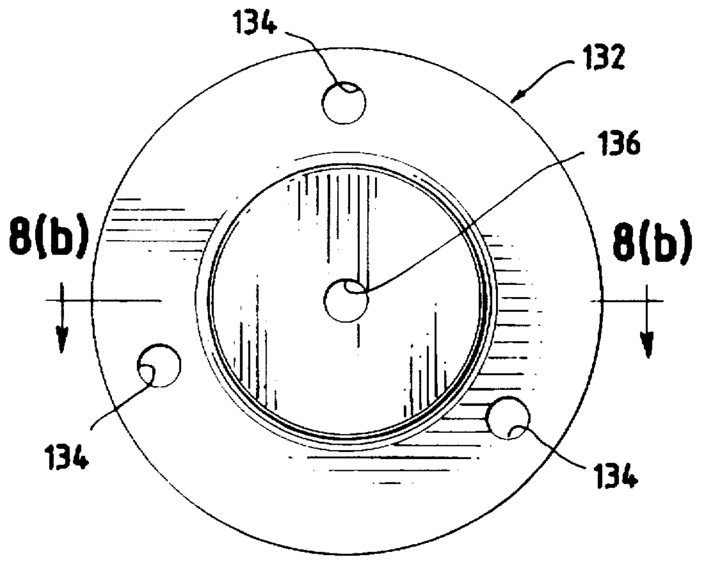
FIG. 8(*a*) is a plan view of the top of the diaphragm cover of the thrust bearing assembly of FIGS. 1(*a*) and 1(*b*)
Figure 8B:
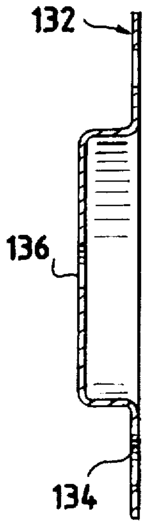
Figure 9:
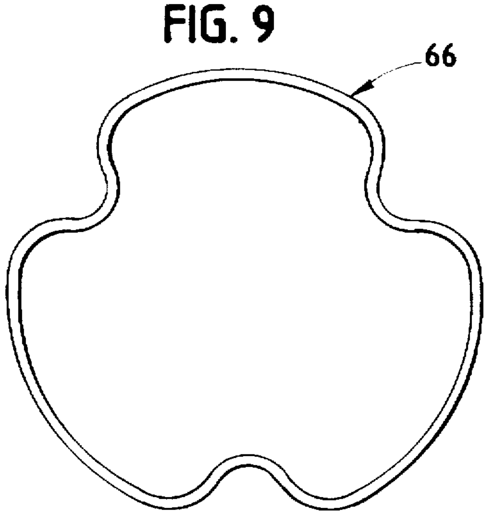
FIG. 9 is a top plan view of the sealing ring of the thrust bearing assembly of FIGS. 1(*a*) and 1(*b*).

In accordance with a preferred embodiment, a plurality of grooves 120 are defined in the bearing surface 52 of the second bearing plate 38, which are adapted to facilitate lubrication and cooling of the bearing surfaces 50, 52. The grooves 120 are in fluid communication with the fluid passageway 60 and with the fluid reservoir 62. In the embodiment of FIG. 3(*a*), three grooves 120 are defined in the bearing surface 52 of the second bearing plate 38. The grooves 120 extend outwardly from the hole 56, and the bottoms of the grooves are arcuate. Desirably, the grooves 120 are offset relative to the center of the hole 56 of the second bearing plate 38, and the center lines defined by the grooves extend at angles of approximately 120° relative to each other.

The fluid reservoir 62 of the thrust bearing assembly 12 preferably is defined beneath the housing 44 by a diaphragm assembly 128 secured to the bottom of the housing, and is adapted to contain a fluid supply for lubrication and cooling purposes and also for pressure equalization. In the illustrated embodiment, the diaphragm assembly 128 is defined by a diaphragm 130 (see FIGS. 7(*a*) and 7(*b*)), and a diaphragm cover 132 (see FIGS. 8(*a*) and 8(*b*)) disposed about and secured to the diaphragm 130. The diaphragm cover 132 may be secured to the housing 44 by the fasteners 64 which are received within apertures 134 defined by the diaphragm cover 132. A central aperture 136 may be defined in the diaphragm cover 132 for equalization of internal and external pressures. The diaphragm 130 is constructed of rubber or other suitable resilient material. The diaphragm cover 132 is preferably constructed of stainless steel. The diaphragm assembly 128 provides a seal for the thrust bearing assembly 12 to prevent leakage of the internal fluid, and to allow for changes in fluid volume due to temperature and outside pressure.

An opening 140 is defined in the base of the housing 44 to provide fluid communication between the fluid passageway 60 and the reservoir 62. The opening 140 and the fluid passageway 60 channel fluid from the reservoir 62 to the grooves 120 of the bearing surface 52 of the second bearing plate 38. In the illustrated embodiment, the opening 140 is disposed between the rectangular slots 114.

The fluid contained in the reservoir 62 may be any suitable fluid that preferably acts as a lubricating and cooling medium, such as, for example, water or a water-based mixture. The fluid desirably is also compatible with the internal components of the thrust bearing assembly 12 and of the other components of the submersible pump assembly 10. The fluid may also contain anti-freezing agents, such as GLYCOL.

The foregoing description is for purposes of illustration only and is not intended to limit the scope of protection accorded this invention. The scope of protection is to be measured by the following claims, which should be interpreted as broadly as the inventive contribution permits.

The claimed invention is:

1. A bearing assembly for a motor assembly of a submersible pump assembly having a rotor shaft driven by the motor assembly, the bearing assembly comprising:

a first bearing member adapted to rotate with the shaft; and a second bearing member adapted to remain stationary relative to the first bearing member during rotation of the first bearing member, the second bearing member having a second bearing surface contacting the first bearing surface, the second bearing surface adapted to absorb axial forces from the first bearing member; and a housing receiving the first and second bearing members; and a thrust bearing holder engaging the first bearing member with the shaft, wherein the thrust bearing holder is rigidly secured to the first bearing member and defines a hole adapted to receive the shaft; and a bottom surface of the thrust bearing holder including a plurality of ribs and a top surface of the first bearing member defining a plurality of recesses receiving the ribs.

2. A bearing assembly for a motor assembly of a submersible pump assembly having a rotor shaft driven by the motor assembly, the bearing assembly comprising:

a first bearing member adapted to rotate with the shaft, the first bearing member having a first bearing surface; and a second bearing member adapted to remain stationary relative to the first bearing member during rotation of the first bearing member, the second bearing member having a second bearing surface contacting the first bearing surface, the second bearing surface adapted to absorb axial forces from the first bearing member; and a housing receiving the first and second bearing members; and a gimbal plate rigidly secured to the second bearing member; and a top surface of the second bearing member defining the second bearing surface and a bottom surface of the second bearing member rigidly secured to a top surface of the gimbal plate, wherein the top surface of the gimbal plate includes a plurality of ribs and the bottom surface of the second bearing member defines a plurality of recesses receiving the ribs.

3. A bearing assembly for a motor assembly of a submersible pump assembly having a rotor shaft driven by the motor assembly, the bearing assembly comprising:

a first bearing member adapted to rotate with the shaft, the first bearing member having a first bearing surface; and a second bearing member adapted to remain stationary relative to the first bearing member during rotation of the first bearing member, the second bearing member having a second bearing surface contacting the first bearing surface, the second bearing surface adapted to absorb axial forces from the first bearing member; and a housing receiving the first and second bearing members; and a gimbal plate rigidly secured to the second bearing member, wherein the gimbal plate is received within the housing and wherein a bottom surface of the gimbal plate is generally rounded and includes an elongated member and wherein an elongated slot is defined in a base of the housing adapted to receive the elongated member, the elongated member and slot adapted to align the second bearing surface with the first bearing surface during operation of the submersible pump assembly.

4. A bearing assembly for a motor assembly of a submersible pump assembly having a rotor shaft driven by the motor assembly, the bearing assembly comprising:

a first bearing member adapted to rotate with the shaft, the first bearing member having a first bearing surface; and a second bearing member adapted to remain stationary relative to the first bearing member during rotation of the first bearing member, the second bearing member having a second bearing surface contacting the first bearing surface, the second bearing surface adapted to absorb axial forces from the first bearing member; and a housing receiving the first and second bearing members; and a gimbal plate rigidly secured to the second bearing member, wherein the gimbal plate is received with the housing and defines a central hole and wherein the housing defines an opening in fluid communication with the central hole, wherein a bottom surface of the gimbal plate is generally rounded and includes a pair of elongated members separated by the central hole and wherein a pair of elongated slots are defined in a base of the housing separated by the opening and adapted to receive the elongated members, the elongated members and slots adapted to align the second bearing surface with the first bearing surface during operation of the submersible pump assembly.

* * * * *

UNITED STATES PATENT AND TRADEMARK OFFICE

Certificate

Patent No. 5,765,950

Patented: June 16, 1998

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: James Joseph Eno; Antonio Tinio Ganzon; William M. Larzelere, all of Romulus, NY.

Signed and Sealed this Thirty-First Day of October, 2000.

DAVID A. BUCCI, *SPE*
Art Unit 3682